Patented Nov. 16, 1937

2,098,967

UNITED STATES PATENT OFFICE 2,098,967

AZO DYESTUFFS

Max Lange, Frankfort-on-the-Main-Hochst, Germany, assignor to General Aniline Works, Inc., New York, N. Y., a corporation of Delaware No Drawing. Application July 9, 1935, Serial No. 30,563. In Germany August 4, 1934

4 Claims. (Cl. 260—92)

The present invention relates to azo-dyestuffs; more particularly it relates to azo-dyestuffs of the following general formula:

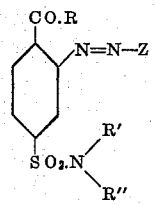

wherein R represents one of the groups OH, O-alkyl, O-aryl, O-aralkyl or the grouping

in which X and Y stand for hydrogen, alkyl, aryl or aralkyl radicals, R' and R'' stand for hydrogen, alkyl, aryl or aralkyl radicals and Z means the radical of an aminonaphtholsulfonic acid or of a derivative of a 1-aryl-5-pyrazolone containing at least one group lending solubility.

I have found that these valuable azo-dyestuffs may be obtained by coupling the diazo-compound of a sulfo-anthranilic acid derivative of the following constitution:

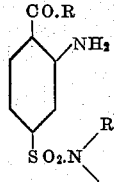

wherein R represents one of the groups OH, O-alkyl, O-aryl, O-aralkyl or the grouping

in which X and Y stand for hydrogen, alkyl, aryl or aralkyl radicals, and wherein R' and R'' stand for hydrogen, alkyl, aryl or aralkyl radicals, with an aminonaphtholsulfonic acid or a derivative of a 1-aryl-5-pyrazolone containing at least one group lending solubility.

The dyestuffs thus obtained are particularly suitable for dyeing animal fibers; they have a good levelling power and yield dyeings of good fastness properties, particularly of a very good fastness to light and a good fastness to perspiration. As far as the dyestuffs are capable of being after-chromed, dyeings of good fastness to potting and to fulling are obtained.

The new dyestuffs have the same good fastness properties as those of German Patent 544,815, and, moreover, have a better levelling power. The dyestuffs of the present invention have also a better levelling power and a better fastness to light than the dyestuffs of German Patents 476,079 and 595,680.

The following examples serve to illustrate the invention, but they are not intended to limit it thereto; the parts are by weight, unless otherwise stated.

(1) 16.4 parts of the base of the following constitution:

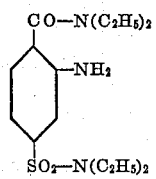

are introduced, while stirring, into 50 parts of sulfuric acid of 50 per cent. strength and converted into the diazo-compound by causing about 8.6 parts of a solution of 40 per cent. strength of sodium nitrite to run into the mixture at a temperature of about 0° C. The strongly acid diazo-solution thus obtained is neutralized with a solution of about 32 parts of sodium bicarbonate in about 300 parts of water and, if necessary, filtered. A neutral, aqueous solution, prepared in the usual manner of 12.5 parts of 2-amino-8-naphthol-6-sulfonic acid, is introduced into this diazo-solution at about 0° C.–5° C. After some time about 20 parts of crystallized sodium acetate are added, until the mass no longer has an acid reaction to Congo paper; the whole is heated to about 70° C. and the dyestuff is salted out with about 100 parts of sodium chloride, then filtered at about 40° C., pressed and dried. It dyes wool in an acid bath vivid bluish red tints. The dyeing thus obtained has a very good fastness to light and a good fastness to perspiration. The dyeings on unloaded silk and on loaded silk are also very fast to light. The dyestuff corresponds with the following formula:

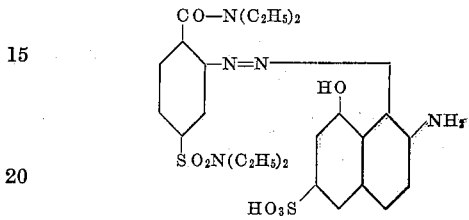

(2) A diazo-solution prepared from 16.4 parts of the base referred to in Example 1 is run at about 0° C. into an aqueous solution of 16.5 parts of 1-(2'-hydroxy-3'-carboxy-5'-sulfo)-phenyl-3-methyl-5-pyrazolone in an excess of sodium carbonate solution. When coupling is completed the reaction mixture is heated to about 70° C., mixed with about 200 parts of sodium chloride and rendered feebly acid to Congo paper by addition of hydrochloric acid. After cooling, the dyestuff is isolated in the usual manner and dried. It dyes wool in an acid bath clear yellow tints of very good fastness to light and good fastness to perspiration.

(3) 16.4 parts of the base referred to in Example 1 are diazotized as described in that example and the diazo-compound is coupled with a solution of about 15.2 parts of 1-(2'-chloro-5'-sulfo)-phenyl-3-methyl-5-pyrazolone in an excess of sodium carbonate solution. A dyestuff is obtained which dyes wool in an acid bath a yellow tint of a somewhat more greenish hue than that described in Example 2. The dyeing possesses the same good properties.

(4) 13.6 parts of the base of the following constitution:

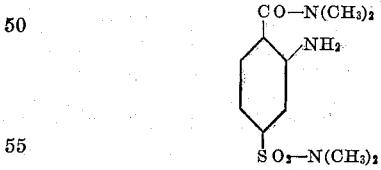

are introduced, while stirring, into a mixture of 15 parts by volume of hydrochloric acid of 30 per cent. strength and 25 parts of water and diazotized at about 0° C. with about 8.6 parts of a solution of sodium nitrite of 40 per cent. strength. A solution of 12.5 parts of 2-amino-8-naphthol-6-sulfonic acid neutralized with sodium carbonate is introduced at about 0° C. into this diazo-solution; the whole is neutralized with about 15 parts of crystallized sodium acetate, heated to about 60° C. after coupling is completed and gradually mixed with about 200 parts by volume of a saturated solution of sodium chloride; the mixture is allowed to cool and the dyestuff is isolated in the usual manner. It dyes wool in an acid bath a tint which is about the same as that of the dyestuff obtained according to Example 1 and possesses similar properties.

(5) 14.3 parts of the compound of the following constitution:

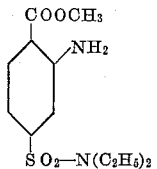

are gradually introduced into a mixture of 25 parts by volume of hydrochloric acid of 30 per cent. strength and 25 parts of water; at the same time about 8.6 parts of a solution of 40 per cent strength of sodium nitrite are run in at about 10° C. to about 20° C. A neutral solution prepared in the usual manner from 12.5 parts of 2-amino-8-naphthol-6-sulfonic acid and sodium carbonate is run into the diazo-solution after the latter has been diluted with a little ice-water and, if necessary, filtered; the mixture is neutralized with about 30 parts of crystallized sodium acetate and, as soon as the coupling is completed, it is heated to about 60° C. about 70° C. Then the mass is rendered feebly alkaline by addition of about 14 parts of calcined sodium carbonate and the dyestuff is filtered at about 40° C. It dyes wool in an acid bath a red tint of a much bluer hue than that of the dyestuff obtained according to Example 1. The dyeing has a good fastness to light and to perspiration.

(6) The diazo-solution prepared from 14.3 parts of the base referred to in Example 5 is run at about 0° C. into a solution of 19 parts of 1-acetamino-8-hydroxynaphthalene-3.6-disulfonic acid in 100 parts of water and 250 parts by volume of a 2N-sodium carbonate solution. When the coupling is complete the whole is heated to about 60° C. to about 70° C. and the dyestuff is salted out by means of sodium chloride and filtered at about 30° C. It dyes wool in an acid bath a yellowish red tint of good fastness to light and to perspiration.

(7) 14.3 parts of the base referred to in Example 5 are diazotized as described in that example. The clear diazo-solution is run at about 0° C. to about 5° C. into a solution of 16.5 parts of 1-(2'-hydroxy-3'-carboxy-5'-sulfo)-phenyl-3-methyl-5-pyrazolone in an excess of sodium carbonate solution and the dyestuff is isolated in the usual manner by addition of sodium chloride. It dyes wool in an acid bath a vivid reddish yellow tint of a very good fastness to light and a good fastness to perspiration and to sea-water.

By after-chroming a reddish yellow tint of very good fastness to perspiration, to sea-water, to potting and to fulling is obtained.

(8) 14.3 parts of the base referred to in Example 5 are diazotized and the diazo-compound is coupled with 15.2 parts of 1-(2'-chloro-5'-sulfo)-phenyl-3-methyl-5-pyrazolone in a solution rendered alkaline by means of sodium carbonate. The dyestuff thus obtained dyes wool in an acid bath greenish yellow tints which have the same advantageous properties of fastness as the dyestuff obtainable according to Example 7.

(9) 13.6 parts of the compound of the following constitution:

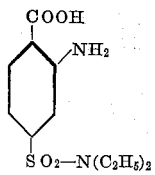

are dissolved in 100 parts of water and 4.5 parts by volume of caustic soda solution of 40° Bé. The solution thus prepared is allowed to run into a mixture of 50 parts of water and 12.5 parts by volume of hydrochloric acid of 37 per cent strength and diazotized at 0° C. with about 50 parts by volume of a normal solution of sodium nitrite. The magma of the diazo-compound thus obtained is coupled in known manner with a solution, rendered alkaline by means of sodium carbonate, of 15.2 parts of 1-(2'-chloro-5'-sulfo)-phenyl-3-methyl-5-pyrazolone. The dyestuff dyes wool in an acid bath a greenish-yellow tint of good fastness to light and to perspiration. By after-chroming a more reddish yellow of good fastness to washing and to fulling is obtained.

The following table shows a further number of azo-dyestuffs which may be obtained according to the present invention:

wherein R represents a member of the group consisting of OH, O-alkyl and the grouping

in which X and Y stand for members of the group consisting of hydrogen, alkyl and phenyl radicals, R' and R'' stand for members of the group consisting of hydrogen, alkyl and phenyl radicals and Z means the radical of an aminonaphtholsulfonic acid, dyeing the animal fiber in general red shades of good fastness properties, particularly of a very good fastness to light and a good fastness to perspiration.

|   | Diazo components | Coupling components | Tints |
|---|---|---|---|
| 1 | 1-aminobenzene-2-carboxylic acid-5-sulfonic acid-amide. | 1-acetylamino-8-hydroxy-naphthalene-3.6-disulfonic acid. | Red. |
| 2 | 1-aminobenzene-2-carboxylic acid-5-sulfonic acid-amide. | 2-amino-8-hydroxynaphthalene-6-sulfonic acid (in an acid medium). | Bluish red. |
| 3 | 1-aminobenzene-2-carboxylic acid-5-sulfonic acid-amide. | 1-(2'-chloro-5'-sulfophenyl)-3-methyl-5-pyrazolone. | Yellow. |
| 4 | 1-aminobenzene-2-carboxylic acid-5-sulfonic acid-phenyl-amide. | 1-(2'-hydroxy-3'-carboxy-5'-sulfophenyl)-3-methyl-5-pyrazolone. | Yellow. |
| 5 | 1-aminobenzene-2-carboxylic acid-5-sulfonic acid-phenyl-amide. | 2-amino-8-hydroxynaphthalene-6-sulfonic acid (in an acid medium). | Bluish red. |
| 6 | 1-aminobenzene-2-carboxylic acid-5-sulfonic acid-phenyl-amide. | 2-phenylamino-8-hydroxy-naphthalene-6-sulfonic acid. | Brown. |
| 7 | 1-aminobenzene-2-carboxylic acid-5-sulfonic acid-diethyl-amide. | 2-amino-8-hydroxy-naphthalene-6-sulfonic acid. | Red. |
| 8 | 1-aminobenzene-2-carboxylic acid-5-sulfonic acid-N-ethyl-phenylamide. | 1-(2'-chloro-5'-sulfophenyl)-3-methyl-5-pyrazolone. | Yellow. |
| 9 | 1-aminobenzene-2-carboxylic acid-5-sulfonic acid-N-ethyl-phenylamide. | 2-amino-8-hydroxynaphthalene-6-sulfonic acid (in an acid medium). | Bluish red. |
| 10 | 1-aminobenzene-2-carboxylic acid-5-sulfonic acid-N-ethyl-phenylamide. | 1-(4'-sulfophenyl)-3-methyl-5-pyrazolone. | Reddish yellow. |
| 11 | 1-aminobenzene-2-carboxylic acid-amide-5-sulfonic acid-amide. | 2-amino-8-hydroxy-naphthalene-6-sulfonic acid (in an acid medium). | Bluish red. |
| 12 | 1-aminobenzene-2-carboxylic acid-amide-5-sulfonic acid-amide. | 1-(2'-hydroxy-3'-carboxy-5'-sulfophenyl)-3-methyl-5-pyrazolone. | Yellow. |
| 13 | 1-aminobenzene-2-carboxylic acid-methylamide-5-sulfonic acid-methylamide. | 2-amino-8-hydroxy-naphthalene-6-sulfonic acid (in an acid medium). | Bluish red. |
| 14 | 1-aminobenzene-2-carboxylic acid-ethylamide-5-sulfonic acid-ethylamide. | 1-(2'-chloro-5'-sulfophenyl)-3-methyl-5-pyrazolone. | Yellow. |
| 15 | 1-aminobenzene-2-carboxylic acid-ethylamide-5-sulfonic acid-ethylamide. | 2-amino-8-hydroxynaphthalene-6-sulfonic acid (in an acid medium). | Bluish red. |
| 16 | 1-aminobenzene-2-carboxylic acid-diethylamide-5-sulfonic acid-diethylamide. | 1-(4'-sulfophenyl)-3-carboxylic acid-ethylester-5-pyrazolone. | Yellow. |
| 17 | 1-aminobenzene-2-carboxylic acid-N-ethylphenylamide-5-sulfonic acid-N-ethylphenyl-amide. | 1-(2'-hydroxy-3'-carboxy-5'-sulfophenyl)-3-methyl-5-pyrazolone. | Yellow. |
| 18 | 1-aminobenzene-2-carboxylic acid-N-ethylphenylamide-5-sulfonic acid-N-ethylphenyl-amide. | 2-amino-8-hydroxynaphthalene-6-sulfonic acid (in an acid medium). | Red. |

I claim:

1. The azo-dyestuffs of the following general formula:

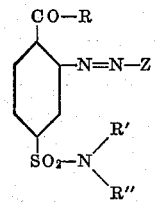

2. The azo-dyestuff of the following formula:

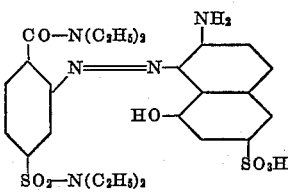

dyeing wool in an acid bath vivid bluish red shades of very good fastness to light and good fastness to perspiration.

3. The azo-dyestuff of the following formula:
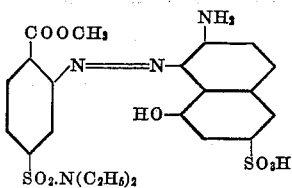
dyeing wool in an acid bath vivid bluish-red shades of good fastness to light and to perspiration.
4. The azo-dyestuff of the following formula:
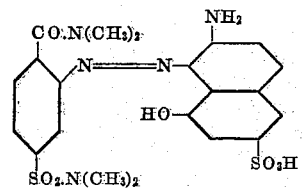
dyeing wool in an acid bath vivid bluish-red shades of very good fastness to light and good fastness to perspiration.
MAX LANGE.